United States Patent [19]

Seksaria et al.

[11] Patent Number: 5,083,515
[45] Date of Patent: Jan. 28, 1992

[54] METHOD AND APPARATUS FOR AFFIXING APPLIQUE ARMOR PANELS TO A SURFACE WITHOUT TOOLS

[75] Inventors: Dinesh C. Seksaria, Murrysville, Pa.; Henry Burgert, Northeastham, Mass.; James D. Klingensmith, Apollo, Pa.

[73] Assignee: Aluminum Company of America, Pittsburgh, Pa.

[21] Appl. No.: 367,786

[22] Filed: Jun. 19, 1989

[51] Int. Cl.$^5$ .................................. E06B 9/00
[52] U.S. Cl. ................................ 109/49.5; 109/81; 411/349; 411/549
[58] Field of Search .................. 109/49.5, 81, 85, 79; 89/36.02, 36.08, 40.03; 114/9, 13; 411/349, 553, 549

[56] References Cited

U.S. PATENT DOCUMENTS

| 1,014,510 | 1/1912 | Papendry | 114/13 |
|---|---|---|---|
| 1,236,033 | 8/1917 | Almengual | 109/81 X |
| 1,273,515 | 7/1918 | Makrenos | 109/81 X |
| 1,287,910 | 12/1918 | De Rosa | 109/81 X |
| 1,294,920 | 2/1919 | Lemiszczak | 109/81 |
| 1,354,671 | 10/1920 | Magnuson | 109/81 |
| 2,077,729 | 4/1937 | Wilcox | 109/81 X |
| 2,332,464 | 10/1943 | Pissarevsky | 109/81 |
| 2,380,393 | 7/1945 | Berg | 109/85 |
| 2,575,311 | 11/1951 | Barry et al. | 411/549 X |
| 2,631,348 | 3/1953 | Bailey | 411/349 |
| 3,123,389 | 3/1964 | Biesecker | 411/549 X |
| 3,263,728 | 8/1966 | Lynch | 411/349 |
| 4,167,889 | 9/1979 | Bohne et al. | 89/36.02 |
| 4,545,286 | 10/1985 | Fedij | 109/85 X |

FOREIGN PATENT DOCUMENTS

| 364574 | 11/1921 | Fed. Rep. of Germany | 109/81 |
|---|---|---|---|
| 888358 | 12/1943 | France | 109/81 |

Primary Examiner—Gary L. Smith
Assistant Examiner—Suzanne L. Dino
Attorney, Agent, or Firm—David W. Pearce-Smith

[57] ABSTRACT

An inexpensive light weight system for attaching, supporting and suspending an item on or from a host surface without the need for tools to secure said item. The system comprises: (1) a base member attached to a host surface, the base member having a means for receiving a removable spacer member; (2) the spacer member having a first end for manually securing to the base and a second end opposite the first end which is provided with a means for receiving a coupling means, the spacer member being capable of damping vibrational energy originating with the host surface; and (3) the coupling means for manually attaching the item to the second end of the spacer member.

17 Claims, 5 Drawing Sheets

METHOD AND APPARATUS FOR AFFIXING APPLIQUE ARMOR PANELS TO A SURFACE WITHOUT TOOLS

TECHNICAL FIELD

The present invention relates generally to devices for supporting and suspending items, such as applique armor panels to a surface. More particularly, the invention is directed to a system for installing applique armor panels on or from a surface without the need of tools.

BACKGROUND ART

Over the years, a number of devices have been employed to hang armor on the armored surfaces of military vehicles. An early (1945) example of this is U.S. Pat. No. 2,380,393 to Berg. Berg secures spacers 5 to an armored surface 2. Each spacer includes a boss 6 that extends through an opening provided in an armor plate 3. A headed bolt 9 is threaded into the boss to secure the armor plate to the spacer and thus to the armored surface.

U.S. Pat. No. 1,273,515 to Makrenos discloses an armor vehicle in which conical springs are placed between the walls of the vehicle and armor bolted thereto. The springs cushion the vehicle when a projectile strikes against the armor.

U.S. Pat. No. 4,167,889 to Bohne et al shows a solid rubber buffer (pacer) secured at its base to the surface of an armored vehicle by a collar 11 welded to the armored surface. A threaded bushing 7 is cast in the rubber spacer, at its outer end, for securing armor plate to the rubber buffer by a bolt 6 threaded into the bushing.

U.S. Pat. No. 4,545,286 to Fedij shows a half spherical steel spacer 26 welded or fused to the back side of an armored tile 12. The tile and spherical spacer are attached to the hull of an armored vehicle by a threaded bolt extending through the spacer and into the vehicle surface. When an incoming shell strikes the tile in an off centered manner the bolt breaks and the tile rotates about the rounded surface of the spacer.

U.S. Pat. No. 1,236,033 to Almengual discloses an arrangement of armor in which helical springs are interconnected by clips 2 to form an impact resistant skin. Cone-shaped springs are linked together and clipped to the vehicle's surface. The interconnected helical springs are then attached to the surface of the vehicle.

There are, of course, many types of military vehicles on which applique armor may be mounted, as well as a multitude of other types of structures using spacer support systems. Each application has its peculiar characteristics and operating conditions, such as ballistic loading, noises and vibrations, etc. In providing applique (auxiliary) armor for each vehicle type, it is desirable that a system for attaching armor be capable of being easily adapted and adjusted to the particular armor/vehicle system and their dynamic conditions.

Current systems for attaching armor panels to vehicles have been demonstrated to be quite effective in protecting military vehicles from impacting projectiles. However, there exists a need for a system of applying armor to a vehicle which permits the mounting and demounting of this outer layer of armor from military vehicles, that can be effected with a minimum of tools, effort and time under field conditions.

Presently available devices for attaching spaced applique armor to a vehicle's hull require the use of bolts and the necessary tools one requires to secure the bolts. Under battlefield conditions, this need for tools can be the key factor which determines the length of time needed to secure the armor panels. Tools are quite often lost or misplaced and valuable time can be lost searching for them.

Often there is an excess supply of willing personnel and an insufficient number of tools to keep them productive. It is wasteful and inefficient to have two dozen soldiers working to secure panels to a vehicle, when they must share one or two necessary tools between them. In addition, the need for tools also makes it difficult to affix the armor panels by field personnel who are dressed in bulky protective suits. Inefficiency and difficulty produce delays which are costly and make the vehicle at least temporarily unavailable for its mission.

Furthermore, many presently available systems for applying armor panel are complicated and require trained personnel. Complicated systems having parts of many different types and shapes require the need of higher level echelon mechanics to perform the work. If higher echelon mechanics are needed to affix the armor panels, either the mechanics must be brought to the field or the vehicles must be brought to a depot or motor pool. In either event, valuable time may be lost waiting for mechanics and the vehicle will be at least temporarily unavailable for its mission.

A further problem with existing systems is that they involve modification of the vehicle's hull surface. This modification may result in degradation of the vehicles structural and/or water integrity. Dissimilar materials used in such modifications may induce corrosion which, if not addressed properly, will require expensive repair.

Another challenge in designing systems to attach applique armor to a vehicle is to reduce the weight of attaching devices. It is desirable, of course, to reduce the vehicle's weight, and it can be appreciated that a large number of dense, hard bosses and bushings attached to the outside surface of the vehicle can add a substantial amount of weight. In addition, such bosses and bushings protrude outwardly from the vehicle surface. When they are not being employed to support applique armor they are subject to being snagged and broken off. Then, when it is desired to mount applique armor on the vehicle, the bosses will not be available. These bosses also require additional space in transport and storage of such vehicles, particularly in the cramped quarters of a ship's hull when a vehicle is being transported overseas, as well as in maneuvering the vehicle amongst trees and other obstacles that may be in the way.

It would be advantageous therefore to provide a method and apparatus that can be readily mounted to existing vehicles without the use of tools and trained personnel.

The principal object of the present invention is to provide a simple system for applying applique armor panels to military vehicles which does not suffer from the difficulties encountered in the traditional attaching-/removing process.

Another object of the present invention is to provide a quick and easy method of replacing damaged applique armor panels without the need of tools.

Yet another object of the present invention is to provide a method of attaching a vehicle armament which will not otherwise affect the operation of the vehicle.

Another object of the present invention is to provide a method of adding vehicle armament which can be manufactured by known manufacturing processes and existing, relatively low cost tooling, using standard hardware, materials and manufacturing technology.

Still another object of the present invention is to provide an armor panel attachment method that does not adversely affect the noise signature of the vehicle during movement.

A further object of the invention is to provide a system for affixing armor which solves the above problems in a low-cost, weight-efficient manner, and in a manner that allows one to adapt mounting devices to the conditions of a particular armored vehicle system or other uses and their environments.

These and other objects and advantages of the present invention will be more fully understood and appreciated with reference to the following description.

DISCLOSURE OF THE INVENTION

A system for supporting and/or suspending an item on or from a host surface without the need for tools to secure the item. The system comprises: (1) a base member attached to a host surface, the base member having a means for receiving a removable spacer member; (2) the spacer member having a first end for manually securing to the base and a second end opposite the first end which is provided with a means for receiving a coupling means, the spacer member being capable of damping vibration energy originating with the host surface; and (3) the coupling means for manually attaching the item to the second end of the spacer member.

The base members are easily attached to a host surface and structure. The base members may be attached to the surface of the vehicle provided in any of the methods known to the art as discussed below.

As explained in greater detail below, the spacer members attach to the base without the need for tools and are easily provided with the needed configuration, material and strength-to-weight ratio. The spacer members will have the "correct" strength, stiffness and damping characteristic necessary to provide noise isolation for the armor, as well as good ballistic performance and dynamic attenuation of vibrations originating with the vehicle or other structure.

The applique armor panels can be hung on the narrow apex end of the spacers when appropriate openings are provided in the armor. The armor is secured to the apex end of the spacer member by a fastener which does not require a tool.

Hence, in the present invention, applique armor panels can be attached to a vehicle surface without welding in the field and also can be easily removed when removal is desired. The spacers can also be removed if desired to minimize outward protrusion. There are no tools needed by personnel working in the field to accomplish attachment and/or removal of the applique armor panels once the bases have been attached to the host surface.

THE DRAWINGS

Other features of the present invention will be further described or rendered obvious in the following related description of the preferred embodiment which is to be considered together with the accompanying drawings, wherein like numbers refer to like parts and further wherein.

MODES FOR CARRYING OUT THE INVENTION

Figure 1:
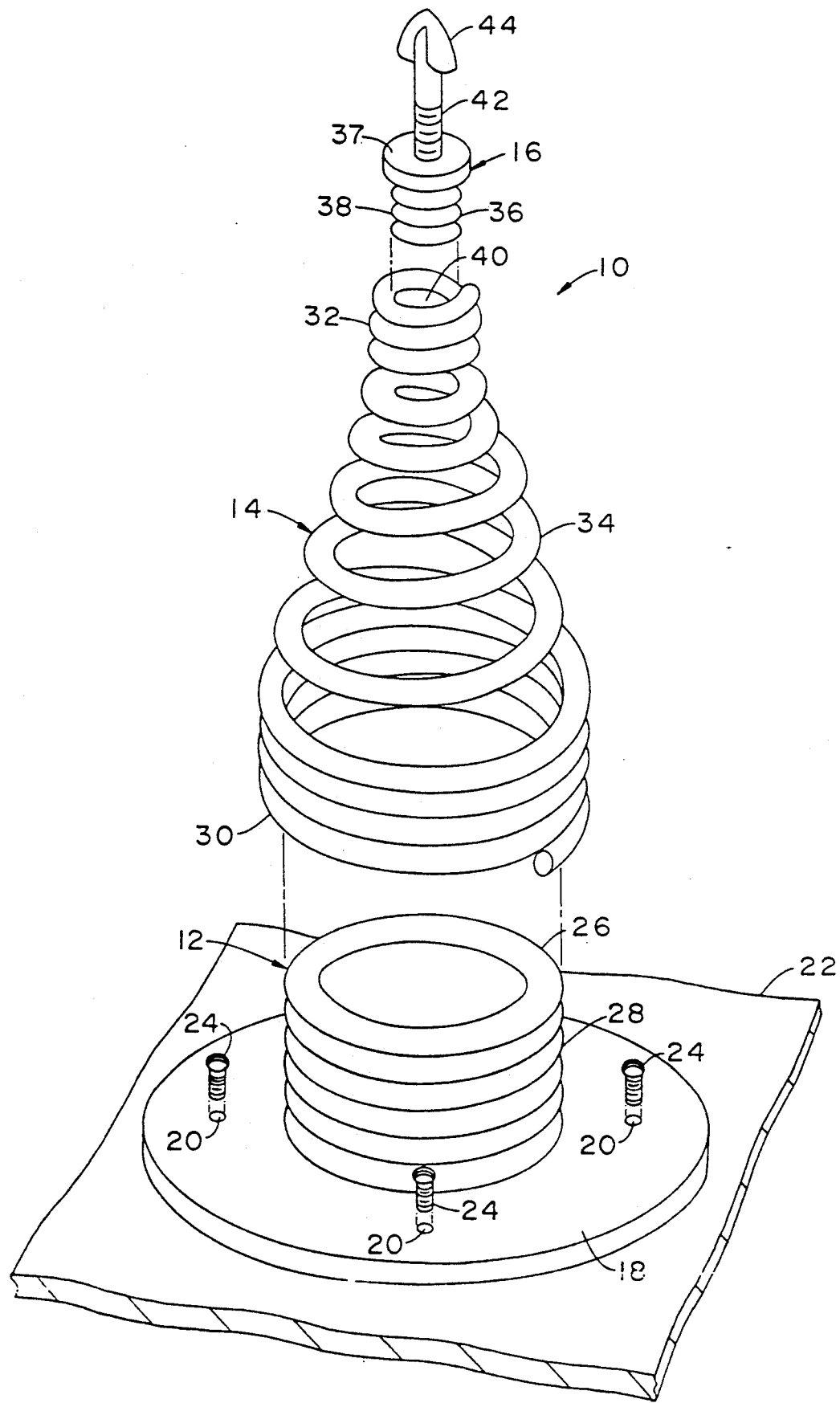
FIG. 1 is an exploded perspective view of a preferred embodiment of the present invention.

Referring now to FIG. 1 of the drawings, there is shown an exploded perspective view of a first embodiment of the armor support system 10 of the present invention. Support system 10 is used for having, suspending or supporting applique armor on a host surface without the need for tools. Support system 10 comprises a base member 12, a spacer member 14, and a coupling means 16.

Base member 12 has a flange area 18 which is provided with openings 20 for the reception of fasteners 24 for attaching base member 12 to the host surface 22 of the object that is to receive the applique armor panel. It is expected that the present invention will find use in military vehicles in which case host surface 22 will be the hull of the vehicle that is being covered with armor. Since military vehicles are not manufactured with true planar surfaces, base member 12 may be formed to mate with non-planar surfaces. It is also to be appreciated that the perfectly planar surface of host surface 22 shown in FIG. 1 may not always be available, particularly when working with the military vehicles in the field that may have been subject to much use and abuse.

Base 12 can be made of a polymer, metallic or composite material. A composite material is one that is man-made from two or more different materials such as glass fiber reinforced plastic or other reinforcing materials such as ceramic. Composite materials are desirable in that they generally weigh less than metal and have larger vibration absorbing capability.

Figure 7:
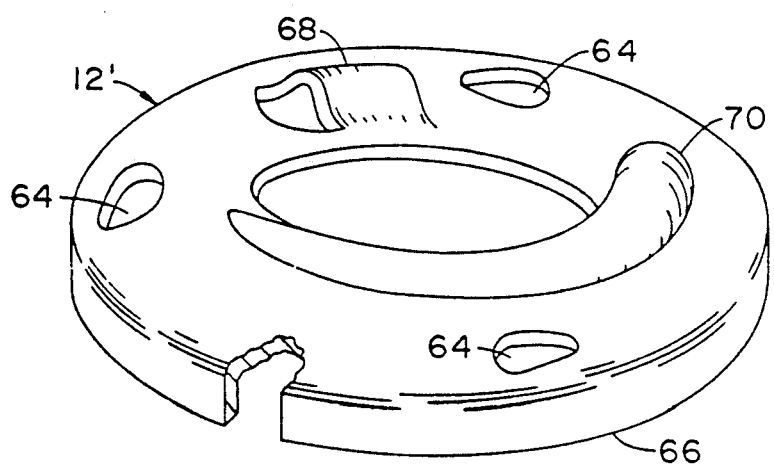
FIG. 7 is a partial cutaway view of part of a second preferred embodiment of a base member of the present invention.
Figure 8:
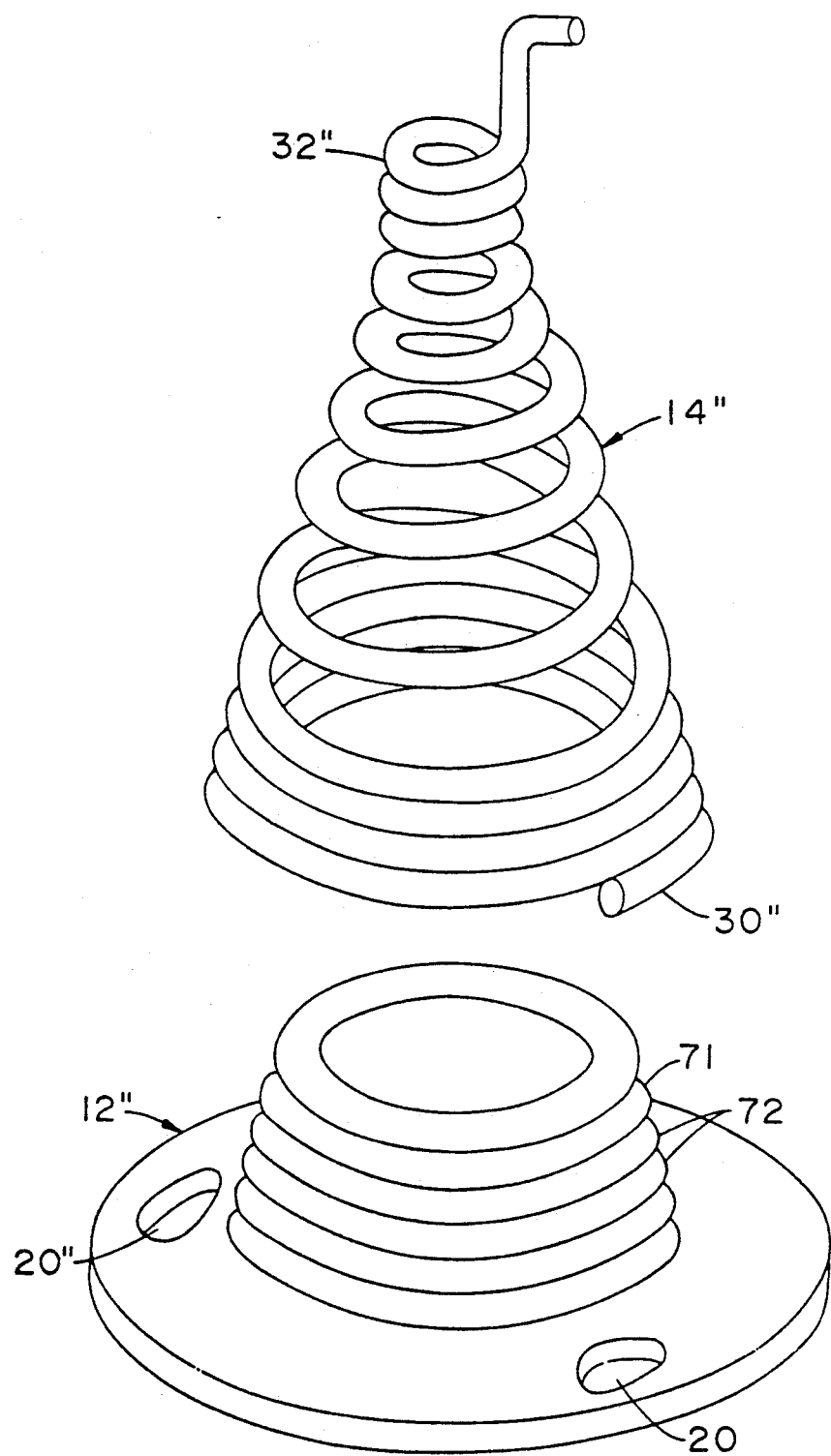
FIG. 8 is an exploded perspective view of a third preferred embodiment of the present invention.

Openings 20 can be circular, as shown in FIG. 1, or keyhole type, as shown in FIGS. 7 and 8. Fasteners 24 may be employed to secure base member 12 to the surface of a host structure. The host surface is provided with openings of appropriate diameter for receiving fasteners 24. Suitable fasteners include buttonhead screws with integral washers.

Base member 12 may be attached to the host surface by other than bolts extending through openings 20. Thus for example, base member 12 may be attached by other mechanical means known to the art, welding, or it may be bonded by a suitable adhesive. The use of adhesive bonding permits attachment of the base to the host surface without adversely effecting its structural and water integrity. Adhesive bonding is also more forgiving of surface imperfections on the host surface and more accommodating to surface variations associated with production. In addition, if adhesive bonding is used the preparation of the host surface is much simpler than bolting. Adhesive bonding does not require machine tools and placement of the base can be conducted at a field depot rather than requiring factory installation. This capability makes it much easier to retrofit existing vehicles.

Base member 12 also has a cylindrical member 26 for receiving spacer member 14. The wall of cylindrical member 26 is shown with helical convolutions 28 that provide depression areas or portions shaped to fit into the lower end 30 of spacer member 14. The convoluted shapes of cylindrical member 26 are not easily made by traditional metal forming process but are easily produced by molding processes. For this reason, base 12 is preferably made of hard rubber, metal or plastic.

Spacer member 14 is a conical spring having a lower end 30 at the base of the cone for connecting to base member 12, an upper end 32 at the narrow or apex of the cone for attaching to coupling means 16, and a tapered section 34 therebetween. Lower end 30 is cylindrically shaped and appropriately sized so that it fits snugly around cylindrical member 26 of base member 12. Spacer member 14 and base 12 are designed so that they can be attached without the need to use tools. The embodiment shown in FIG. 1 is designed so that spacer member 14 can be attached to base 12 by screwing end 30 over member 26 until end 30 bottoms against flange 18. This arrangement facilitates the task of attaching applique armor panels to a host surface and can be important when the panel must be affixed in the field.

The conical shape of spacer member 14 has the advantage of being flexible to absorb the vibration and some of the impact of a projectile that strikes the armor plate. In addition, the conical shaped spring can be manufactured by inexpensive means. The result is a weight-efficient, structurally sound, low cost attachment device.

The total height of the spacer member is normally determined by the ballistic threat defeat requirement, whereas the size of the base member is defined by structural strength requirements. The pitch of the helix in tapered section 34, the cross sectional size of the spring, the composition of the material used in fabricating spacer member 14, as well as its thickness, and the depth and height of convolutions 28 are all parameters that can be chosen to provide a cost effective spacer structure that is tailored to the specific needs of a particular armor application in terms of strength, stiffness and damping capability, and one that is optimized in regard to strength-to-weight ratio. As discussed earlier, there are many different types of vehicles used by the military that employ applique armor panels. The tooling employed to make the conical spring structure are easily altered to meet design specifications and changes in specifications. Similarly, the material of spring is easily changed to meet design specifications. The axisymmetric shape of spacer member 14 is easily made by traditional metal forming processes. The spacer member can be made from corrosion resistant high strength and high elastic modulus materials, e.g. Ni-Cr-steel, Ti-alloys and fiber reinforced materials. For this reason, the overall capital investment needed to make multiple cone systems is reduced.

Still referring to FIG. 1, coupling means 16 is designed so that section 36 will fit snugly into the apex or upper end 32 of spacer member 14. Section 36 is made of a hard rubber material designed to compress slightly to insure a tight fit. The outer wall of section 36 has convolutions 38 that are patterned to compliment the inside wall of upper section 32. Coupling means 16 may be threaded into opening 40 until flange 37 rests against upper section 32 (see FIG. 2). In the same manner that spacer member 14 is attached to base member 12 by people using only their hands, coupling means 16 can be attached to spacer member 14. This may be done even if they are wearing bulky protective gloves.

Figure 2:
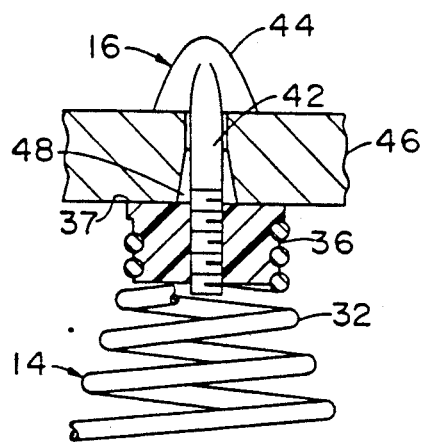
FIG. 2 is a sectional view of the coupling means of the embodiment of FIG. 1 with an applique armor panel attached thereto.

Turning now to FIG. 2, coupling means 16 has a shaft 42 which is threaded at one end and screws into section 36. A bayonet 44 attached to shaft 42 is used to attach coupling means 16 to an applique armor panel 46. Towards this end, applique armor panel 46 is provided with a slotted hole 48 which will receive and allow bayonet 44 to pass therethrough when it is aligned with slotted hole 48 and will not allow bayonet 44 to pass therethrough when it is rotated one quarter turn (90 degrees) relative to slotted hole 48. Slotted hole 48 may be tapered as shown to facilitate entry of bayonet 44.

In operation, it is preferred to have base member 12 prebolted, adhesively bonded or welded to the surface of the a host surface before the need for armor arises. When the need arises, untrained personnel can screw spacer member 14 on cylindrical member 26 and coupling means 16 into hole 40. Applique armor panel 46 is then placed against bayonet 44. Shaft 42 is then rotated to align bayonet 44 and slotted hole 48 so as to allow bayonet 44 to pass therethrough. Once the bayonet has cleared the slotted hole 48 it is then rotated one quarter turn (90 degrees) to prevent the bayonet from exiting the slotted hole. Bayonet 44 may be further rotated in half turn increments (multiples of 180 degrees) to screw shaft 42 into section 36 so that surface 37 will remain flush against applique armor panel 46.

The entire procedure is repeated so that each prepositioned base member has an applique armor panel affixed thereto. The panels are all attached manually without the use of hand tools such as for example, screwdrivers, hammers, wrenches and pliers. The panels can be affixed by people using only their hands, even if they are wearing bulky protective gloves. This is important, for example, in attaching applique armor panels to the hull of a military vehicle. Military personnel working in the field under battlefield conditions and desiring to hang armor panel on a vehicle, need not waste valuable time locating tools.

Once the armor panel is in place, the conical springs maintain the panel the required distance from the vehicle hull when a projectile strikes armor panel such that the personnel within the vehicle are protected from the incoming projectile. Damaged panels can be easily replaced by field personnel without withdrawing the vehicle from service for repair at a higher-level facility. In addition, the armor panels can be quickly removed without tools so that the vehicle can be maneuvered into positions that are difficult to reach.

Figure 3:
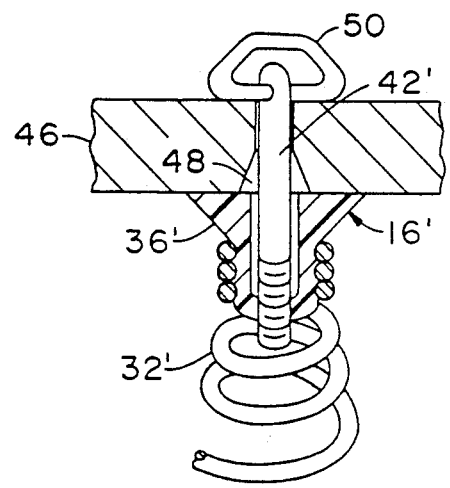
FIG. 3 is a sectional view of a second preferred embodiment of a coupling means of the present invention with an applique armor panel attached thereto.
Figure 4:
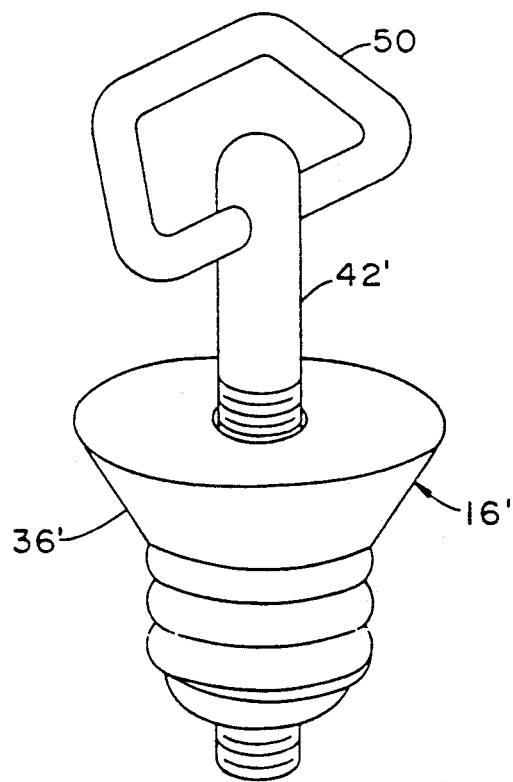
FIG. 4 is a perspective view of part of the embodiment of FIG. 3.

Turning next to FIGS. 3 and 4, there is shown a second preferred embodiment of a coupling means of the present invention attached to applique armor panel 46. Coupling means 16' of FIG. 3 differs from that shown in FIG. 2 in that it does not have a bayonet attached to the shaft. Shaft 42' of FIG. 3 has a turn key 50 which fits into slotted hole 48 as before.

Alternately, second preferred embodiment of coupling means 16' can be placed against the surface of applique armor panel 46 prior to insertion of turn key 50 into hole 48. The turnkey is then inserted through an opening in applique armor panel 46 and screwed into the hole in section 36'. In a third method of attaching the second preferred embodiment of the coupling means, the turn key 50 will be attached to applique armor panel 46 and stored therewith so that coupling means 16 will not be misplaced in the field. The applique armor panel containing the turnkey will then be brought to the host surface and attached as described above.

The advantage of turn key 50 is that it can be made to lie flat against applique armor panel 46 and does not protrude outwardly from the vehicle surface. The lower profile of turn key 50 helps prevent it from becoming snagged and broken off. Turn key 50 also requires less additional space than bayonet 44 in the transport and storage of such vehicles. The lower profile is particularly important in maneuvering the vehicle amongst trees and other obstacles that may be in the way. As with the embodiment shown in FIGS. 1 and 2, the embodiment of FIGS. 3 and 4 permits applique armor panels to be affixed by people using only their hands, even if they are wearing bulky protective gloves.

Figure 5:
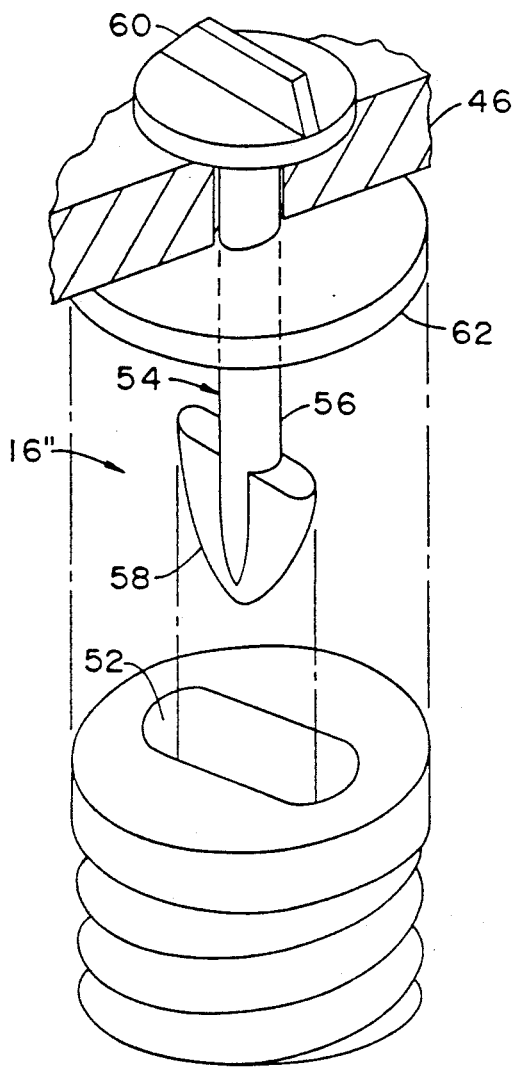
FIG. 5 is an exploded perspective view of a third preferred embodiment of a coupling means of the present invention.
Figure 6:
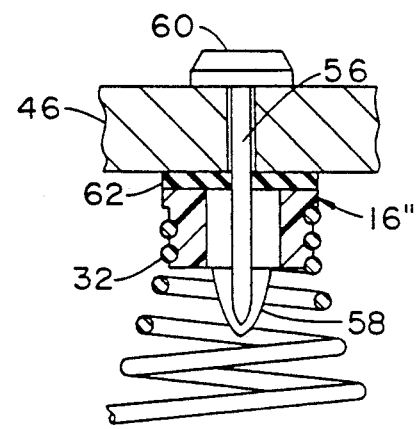
FIG. 6 is a sectional view of part of the embodiment of FIG. 5 with a spacer member attached thereto.

FIGS. 5 and 6 illustrate a third preferred embodiment of a coupling means of the present invention. FIG. 5 is an exploded perspective view of a third preferred embodiment of a coupling means of the present invention. The coupling means 16" of FIG. 5 has a slotted hole 52 for receiving pin 54. Pin 54 comprises a shaft 56, a spade 58 located at the end of the shaft and a head 60 located at the end of the shaft opposite the spade. Spade 58 is used to attach coupling means 16" to an armor panel 46 (see FIG. 6). Towards this end, a compressible washer 62 is positioned between coupling means 16" and armor panel 46 to insure a tight fit therebetween.

The holes in applique armor panel 46 and washer 62 may be either fitted to receive round shaft 56 (see FIG. 5) or they may be slotted like hole 48 in FIG. 2. With slotted holes, pin 54 is detachable from armor plate 46 and spade 58 is passed therethrough when the spade is properly aligned. If the holes in applique armor panel 46 and washer 62 are fitted to receive round shaft 58 as shown in FIG. 5, pin 54 will either be left in the holes and stored with the armor panels or pin 54 will need to have a detachable head which can be detached to allow shaft 56 to pass therethrough and then reattached to keep the pin in place. In either event, after pin 54 is positioned so that spade 58 protrudes from the applique armor panel 46 it is inserted into slotted hole 52 and rotated one quarter turn to secure the panel to the host surface. As with the embodiment shown in FIGS. 1 and 2, the embodiment of FIGS. 5 and 6 permits armor panels to be affixed by people using only their hands, even if they are wearing bulky protective gloves.

FIG. 7 is a partial cutaway view of a second preferred embodiment of a base member 12' of the present invention. Base member 12' is formed by stamping a plate of metal. Base member 12' has three holes 64 stamped therethrough which are equally spaced around it. The cutaway portion reveals that in a preferred embodiment of the invention base member 12' is formed from a stamped plate. Holes 64 are designed to accept screws or bolts in much the same manner as base 12 in FIG. 1. An alternate method for fastening base member 12' to the host surface is by fillet welding its outer edge 66.

Base member 12' has an area 68 which is designed to receive the lower end of a spacer member spring (shown in FIG. 1). The spring is threaded through area 68 and inserted into recess 70 which has been stamped into the surface of base member 12'. As with the embodiment shown in FIG. 1, the embodiment of FIG. 7 permits armor panels to be quickly affixed by people using only their hands, even if they are wearing bulky protective gloves.

Figure 9:
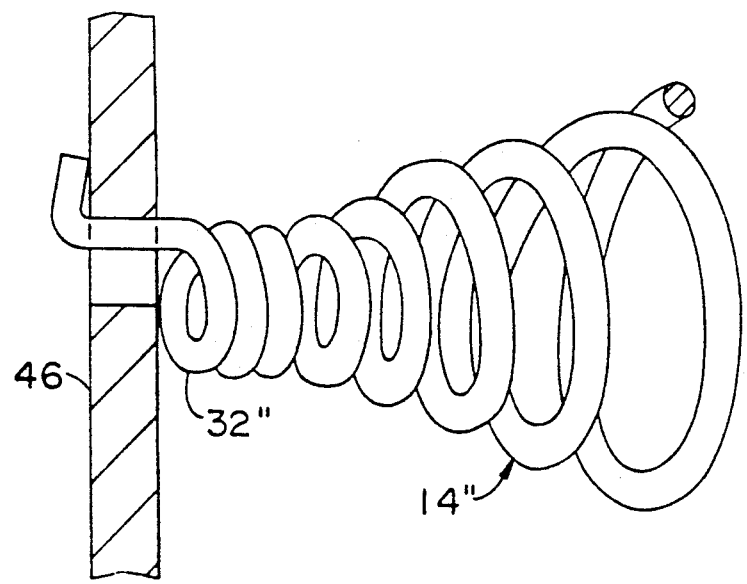
FIG. 9 is a sectional view of the embodiment of FIG. 8 with an applique armor panel attached thereto.

FIGS. 8 and 9 show a third embodiment of the system of the present invention. FIG. 8 is an exploded perspective view of a third preferred embodiment of a base member 12" of the present invention and a second preferred embodiment of a spacer member. Base member 12" is similar to base member 12 shown in FIG. 1 except that holes 20" are teardrop shaped to receive bolts that protrude upward from a host surface (not shown). Base member 12" is fastened to the host surface by rotating base member 12" after the bolts, which are pre-attached to the host surface, are inserted into holes 20".

In addition, base member 12" also has a conical member 71 for receiving spacer member 14". The wall of conical member 71 is shown with helical convolutions 72 that provide flange areas or portions shaped to fit into the lower end 30" of spacer member 14". The convoluted shapes of conical member 71 are not easily made by traditional metal forming process but are easily produced by molding processes. For this reason, base 12" is preferably made of hard rubber, metal or plastic.

Spacer member 14" is a conical spring having a lower end 30" at the base of the cone for connecting to base member 12", an upper end 32" at the narrow or apex of the cone for attaching to applique armor panel 46" (shown in FIG. 9). Lower end 30" is conically shaped and appropriately sized so that it fits snugly around conical member 70 of base member 12". Spacer member 14" and base 12" are designed so that they can be manually attached without the need to use tools.

In operation, base member 12" is fastened to the host surface by rotating base member 12" after bolts, which have been pre-attached to the host surface, are inserted into holes 20". Lower end 30" of spacer member 14" is then fit snugly around conical member 71. Applique armor panel 46" is then brought to upper end 32" so that upper end 32" can be passed through holes 74 of panel 46" (shown in FIG. 9) to cause panel 46" to be affixed to spacer member 14". As with the embodiment shown in FIG. 1, the embodiments of FIGS. 8 and 9 permit applique armor panels to be quickly affixed by people using only their hands, even if they are wearing bulky protective gloves.

It is to be appreciated that certain features of the present invention may be changed without departing from the present invention. Thus, for example, the invention has been described in terms of armor for vehicles and has special use for armored cars and vehicles that may be used for military purposes such as for example, an ambulance, tank, troop carrier, sea vessels, aircraft, and the like. It is to be appreciated that although the invention was described in terms of military vehicles it is contemplated that it will find civilian uses on vehicles such as armored cars used to transport large sums of money. It is also contemplated that the present invention will be used to protect surfaces of buildings and other non-vehicular surfaces that may require enhanced protection against projectile impact. Other uses would include architectural/industrial piping attachments.

Furthermore, it is contemplated that those skilled in the art will recognize that the threaded attaching pieces of the present invention should all possess either right hand threads or left hand threads. This is not a requirement of the invention, however it will insure that one piece will not loosen when another piece is being tightened. Thus for example, if all of the described parts contain right hand threads, when coupling means 16 is being secured into spacer member 14 by rotating coupling means in a clockwise direction, spacer member 14 is also being tighten into base member 12.

In addition, other than a conical spring may be used to form the spacer member; for example, a solid conical funnel may be used.

These and other changes of the type described could be made to the present invention without departing from the spirit of the invention. The scope of the present invention is indicated by the broad general meaning of the terms in which the claims are expressed.

What is claimed is:

1. A system for supporting or suspending an item on or from a host surface without the need for tools to secure said item, said system comprising:
   a base member attached to said host surface, said base having helical grooves to for receiving a removable spacer member;
   said removable spacer member having a first end capable of being manually secured to said base member and a second end opposite said first end, said removable spacer member separating said base member from said item; and
   coupling means for manually attaching said item to said second end of said removable spacer member, said coupling means including an elongated coupling body for extending into an opening at said second end of said spacer member to secure said item supported on said second end.

2. The system of claim 1 in which said coupling body includes:
   a section threaded to mate with said opening at said second end of said spacer member.

3. The system of claim 1 in which said coupling body is loaded primarily in tension and shear when fully threaded into said second end.

4. The system of claim 1 in which said coupling body includes:
   a threaded central bore for receiving a connector.

5. The system of claim 4 in which said coupling means includes:
   said connector for extending into a hole in said item, said connector having a head end which will not pass through said hole.

6. The system of claim 5 in which said head is a clock key handle.

7. The system of claim 5 in which said hole and said head are elongated and said head will pass through said hole only when it is properly aligned with respect to said hole.

8. The system of claim 7 in which said head will not pass through said hole when it is rotated relative to said hole.

9. The system of claim 1 in which said coupling body includes an entry end which will pass through said hole only when it is rotated relative to said hole and will not pass through said hole when it is rotated.

10. The system of claim 7 in which said entry end will not pass through said hole when it is rotated 90 degrees relative to said hole.

11. An applique armor support system for manually attaching and detaching armor to a host surface without the need to use tools to secure the armor, said system comprising:
    a base member attached to said host surface;
    a removable spacer member capable of dampening energy and having a first end capable of being manually secured to said base member without the need to use tools and a second end opposite said first end, said removable spacer member separating said base member from said armor; and
    coupling means for manually securing an armor panel to said second end of said spacer member, said coupling means extending into a hole in said armor and having a head end which will pass through said hole when said head is in a first position and will not pass through said hole when it is rotated into a second position.

12. An applique armor support system for manually attaching and detaching armor to a host surface without the need for tools to secure said armor, said system comprising:
    a base member attached to said host surface, said base having helical grooves for receiving a removable spacer member;
    said removable spacer member having a first end capable of being manually secured to said base member without the need to use tools and a second end opposite said first end, said removable spacer member separating said base member from said armor; and
    coupling means for manually securing and releasing an armor panel to said second end of said removable spacer member, said coupling means including an elongated coupling body for extending into an opening in said second end of said spacer member to secure said armor panel.

13. The system of claim 12 in which said spacer member is a coiled wire.

14. The system of claim 12 in which said coiled wire is coiled in the shape of a helix.

15. A lightweight spacer for releasably supporting an armor panel on or from a host surface, comprising:
    a base end capable of being releasably secured to a host surface without tools;
    an apex end for receiving the item to be supported by a cone-shaped structure, said apex end being provided with an opening for receiving a fastener which will secure an armor panel without tools; and
    said cone-shaped body disposed between said base end and said apex end, said body capable of damping vibration energy originating with the host surface.

16. The system of claim 15 in which said spacer is a coiled wire.

17. A method of supporting and releasing a solid armor panel on or from a host surface without the need for tools to secure said solid armor panel, said method comprising the steps of:
    attaching a base member to a host surface;
    manually securing a first end of a spacer member to said base member; and
    manually attaching said solid armor panel to said spacer member by inserting a second end of said spacer member into an opening in said solid armor panel and then turning said second end relative to said solid armor panel to prevent said solid armor panel from detaching.

* * * * *